US007159836B2

(12) United States Patent
Parks et al.

(10) Patent No.: US 7,159,836 B2
(45) Date of Patent: Jan. 9, 2007

(54) FLOW THROUGH MOLDING APPARATUS AND METHOD

(75) Inventors: Jerry M. Parks, Granville, OH (US); Anthony L. Rockwell, Pickerington, OH (US); Randall E. Nyhart, Granville, OH (US); Larry E. Targett, Pickerington, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 318 days.

(21) Appl. No.: 10/609,942

(22) Filed: Jun. 30, 2003

(65) Prior Publication Data

US 2004/0262816 A1 Dec. 30, 2004

(51) Int. Cl.
*B28B 7/02* (2006.01)

(52) U.S. Cl. ....................... 249/155; 425/407; 264/546

(58) Field of Classification Search ................ 249/155; 264/546; 425/407
See application file for complete search history.

(56) References Cited

U.S. PATENT DOCUMENTS 3,596,869 A 8/1971 Humphrey
4,263,007 A * 4/1981 Battigelli et al. ........... 425/371
4,596,592 A 6/1986 Frank
4,711,653 A 12/1987 Frank et al.
4,741,751 A 5/1988 Claassen et al.
4,806,140 A 2/1989 Krug et al.
5,151,277 A 9/1992 Bernardon et al.
5,192,560 A 3/1993 Umetsu et al.
5,281,117 A 1/1994 Hong
5,330,343 A 7/1994 Berteau
5,433,905 A * 7/1995 Tisch .......................... 264/83
5,470,590 A 11/1995 Brubaker et al.
5,513,972 A 5/1996 Schroeder et al.
5,529,479 A * 6/1996 Souders ...................... 425/384
5,546,313 A 8/1996 Masters
6,257,866 B1 * 7/2001 Fritz et al. ............... 425/387.1
6,354,561 B1 3/2002 Fahrion
6,398,992 B1 6/2002 Jacobson
6,578,399 B1 * 6/2003 Haas et al. .................... 72/57

* cited by examiner

*Primary Examiner*—Joseph S. Del Sole
*Assistant Examiner*—Maria Veronica Ewald
(74) *Attorney, Agent, or Firm*—Inger H. Eckert; Maria C. Gasaway

(57) ABSTRACT

A mold for molding fibrous molding media includes upper and lower mold bodies defining a mold cavity, the upper and lower mold bodies being movable relative to each other to close the mold. The upper and lower mold bodies have respective upper and lower mold surfaces for contacting the fibrous molding media positioned within the mold, and have gas flow openings configured to direct gases into contact with the fibrous molding media. The mold also includes a source of gas connected to the gas flow openings.

10 Claims, 2 Drawing Sheets

26
48
50
16
28
40
32
54
52
18
30

62
P
12
48
57
V
V
56
16
50
24
20
18
52
54
58
V
V
59
14

26
48
50
16
28
40
32
54
52
18
30

34

FLOW THROUGH MOLDING APPARATUS AND METHOD

TECHNICAL FIELD

This invention relates to a method and apparatus for molding fibrous material. More particularly, this invention pertains to a molding process and apparatus involving placing a fibrous molding media in a mold and molding the fibrous molding media into a fibrous molded product.

BACKGROUND OF THE INVENTION

Compression molding and injection molding are common techniques for molding solid fiber reinforced plastic products. Such products typically have 5 to 50 percent by weight fibrous material, with the remainder being a plastic resin material, and these products usually have a density greater than about 5 pounds per cubic foot (pcf). Compression molding is also used to form molded fibrous insulation products, which typically have a density less than about 5 pcf. Such molded fibrous insulation products include thermal insulation for mechanical applications, such as pipe insulation and duct insulation, as well as acoustical and thermal insulation products for such applications as appliances and automobiles. The fibers for these fibrous insulation products include mineral fibers, such as glass fibers, as well as polymer fibers, such as polyethylene terephthalate (pet) or polypropylene (pp) fibers. The fibrous insulation products made with mineral fibers typically include a heat settable binder material in an amount within the range of from about 5 percent to about 20 percent by weight. The fibrous insulation products made with polymer fibers often do not include binder material, relying on fiber-to-fiber bonding for the structural integrity of the product.

The molded fibrous insulation products are formed by placing a fibrous molding media into a mold having heated upper and lower mold bodies, and closing the mold. The heat from the mold bodies sets or cures the binder, where a binder is present, thereby forming the fibrous insulation product with the desired shape, density and stiffness for the intended product application. Where a binder is not present, as with a polymer fiber insulation product, the heat from the mold bodies bonds the polymer fibers together where they intersect with each other, thereby forming the fibrous insulation product with the desired shape, density and stiffness for the intended product application. The heat transfer process from the mold body surface to the fibrous molding media is primarily by conduction and radiation. This heat transfer into and through the fibrous molding media during the molding process cannot be controlled easily.

During the molding of the fibrous insulation product the surface of the fibrous molding media assumes the shape of the surface of the upper and lower mold bodies. It can be appreciated that the surface or contour of the upper and lower mold bodies must be changed when it is desired to mold a fibrous insulation product of different shapes. This requires changing the mold bodies for each different desired insulation product. Typically it takes a considerable amount of time and money to make new molds with the desired contours. The changing of mold surfaces can be simplified by using changeable or replaceable mold inserts within the upper and lower mold bodies. However, it would be advantageous if the process and apparatus for molding fibrous insulation products could be further improved.

SUMMARY OF THE INVENTION

The above objects as well as other objects not specifically enumerated are achieved by a mold for molding fibrous molding media. The mold includes upper and lower mold bodies defining a mold cavity, the upper and lower mold bodies being movable relative to each other to close the mold. The upper and lower mold bodies have respective upper and lower mold surfaces for contacting the fibrous molding media positioned within the mold, and have gas flow openings configured to direct gases into contact with the fibrous molding media. The mold also includes a source of gas connected to the gas flow openings.

According to this invention there is also provided a method of molding fibrous molding media. The method includes providing upper and lower mold bodies defining a mold cavity, the upper and lower mold bodies being movable relative to each other to close the mold, the upper and lower mold bodies having respective upper and lower mold surfaces for contacting the fibrous molding media positioned within the mold, and the upper and lower mold surfaces having gas flow openings configured to direct gases into contact with the fibrous molding media. A gas is supplied to the gas flow openings from a source of gas. The gas is directed from the flow openings into the fibrous molding media.

Various objects and advantages of this invention will become apparent to those skilled in the art from the following detailed description of the preferred embodiment, when read in light of the accompanying drawings.

DETAILED DESCRIPTION OF THE INVENTION

Figure 1:
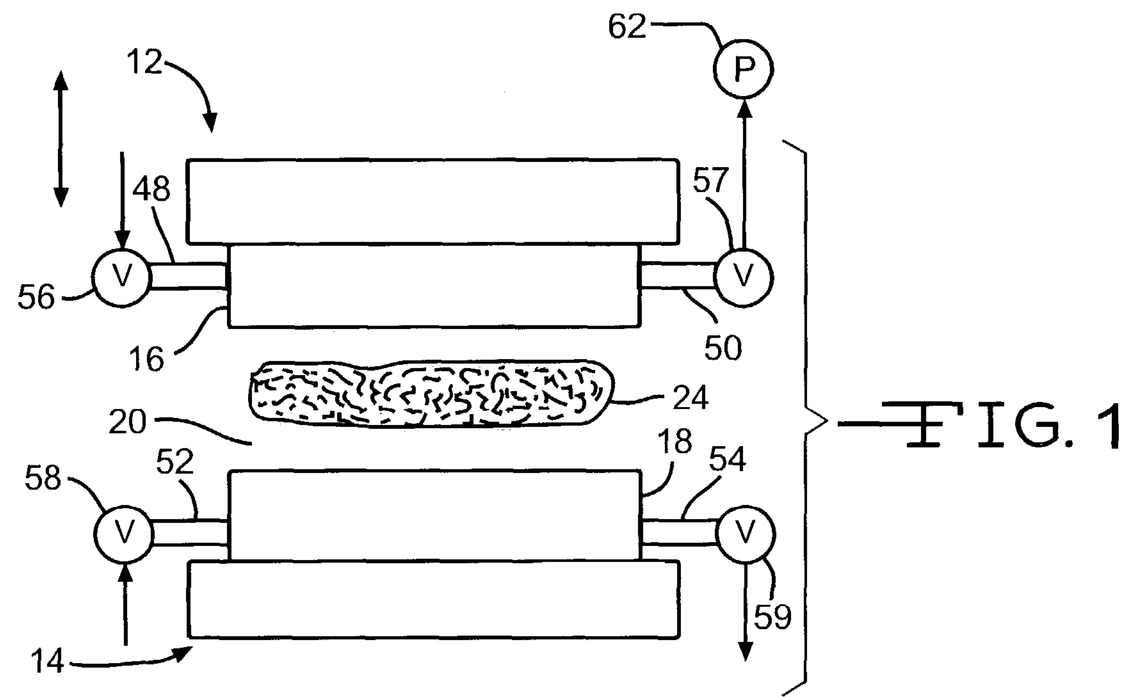
FIG. 1 is a schematic view in elevation of mold for molding fibrous molding media into molded insulation products.
Figure 2:
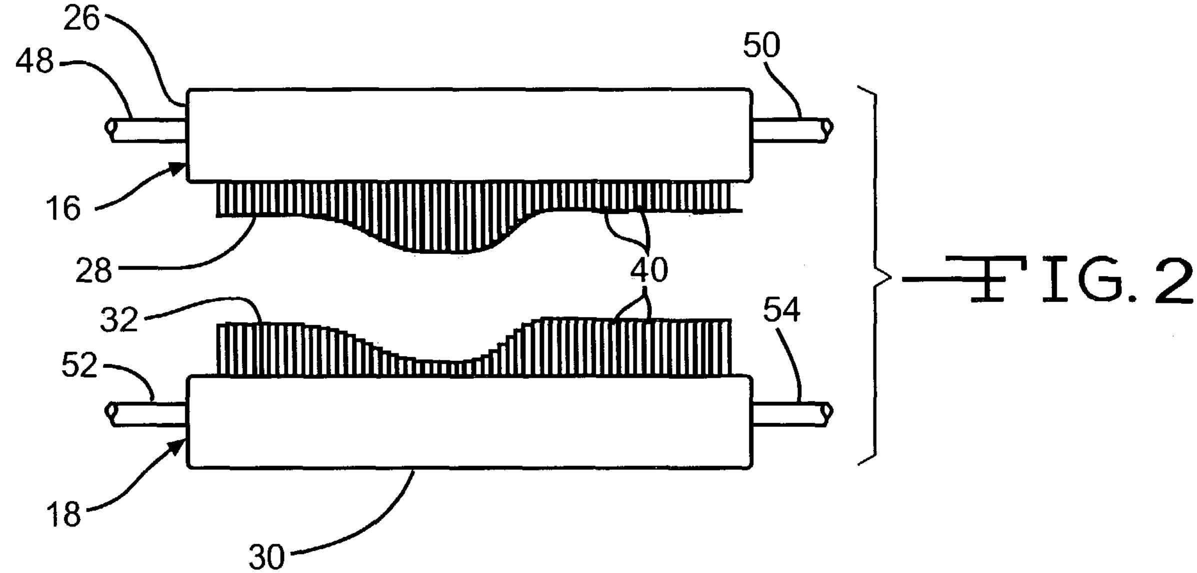
FIG. 2 is a schematic view in elevation of upper and lower mold surfaces of the mold of FIG. 1
Figure 3:
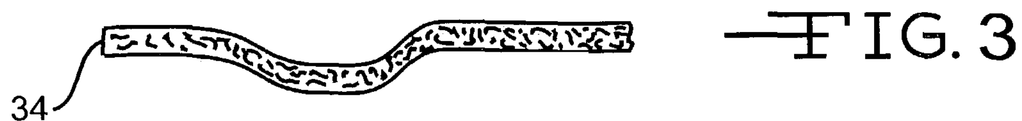
FIG. 3 is a schematic elevational view of molded fibrous media.

FIGS. 1–3, illustrate a mold suitable for molding fibrous media. The mold includes upper mold body 12 and lower mold body 14. The upper and lower mold bodies 12, 14 are mounted so that one or both are moveable toward each other to close the mold 12. The term "movable relative to each other to close the mold" means that either the upper mold body, or the lower mold body, or both the upper and lower mold bodies move to close the mold. Typically, one of the mold bodies 12, 14 is mounted for vertical movement while the other mold body is fixed. The upper mold body 12 is provided with an upper mold assembly 16, and the lower mold body 14 is provided with a lower mold assembly 18, with the upper and lower mold assemblies 16, 18 defining a mold cavity 20 when the mold is closed. During the molding process the fibrous molding media 24 is placed in the mold and then the upper and lower mold bodies 12, 14 are moved relative to each other to enclose the fibrous molding media 24 within the cavity 20, where the fibrous molding media 24 is molded into a molded product 34. As shown in FIG. 2, the upper mold assembly 16 includes an upper manifold 26 and an upper mold surface 28. The lower mold assembly 18 includes a lower manifold 30 and a lower mold surface 32. The shape or contour of the upper and lower mold surfaces 28, 32 defines the shape or contour of the molded product 34.

The fibrous molding media 24 can be any suitable fibrous material including mineral fibers, such as glass fibers, as well as polymer fibers, such as polyethylene terephthalate or polypropylene fibers. Molded fibrous products made with mineral fibers typically include a heat settable binder material in an amount within the range of from about 5 percent to about 20 percent by weight, although the amount of binder can be outside this range. Typical binders for molded products of mineral fibers are thermosetting binders, such as phenol-formaldehyde urea binders, that cure upon the application of sufficient heat. Thermoplastic binders can also be used on mineral fibers. Molded fibrous products made with polymer fibers often do not include binder material, relying on fiber-to-fiber bonding for the structural integrity of the product. In some cases a polymer fibrous molding media includes primary polymer fibers and polymer binder fibers having a softening temperature lower than that of the primary polymer fibers.

In order to set or cure the fibrous molding media 24, a flow of heated gases is directed through the fibrous molding media. The upper mold surface 28 and the lower mold surface 32 are provided with gas flow openings 36, shown in FIGS. 4 and 5, through which the gases are directed into contact with the fibrous molding media 24. The heated gases flowing through the openings 36 set or cure the fibrous molding media 24 so that the moldable media assumes the desired shape of the final product 34. More specifically, the heat from the hot gases cures the binder in a mineral fiber molding media, forming a molded insulation product 34 having the desired shape, density and stiffness for the intended product application. Where a binder is not present, as with a polymer fiber molding media, the heat from the hot gases sets or fuses the polymer fibers together where they intersect with each other, thereby forming the fibrous insulation product 34 with the desired shape, density and stiffness for the intended product application.

It can be appreciated that the surface or contour 28, 32 of the upper and lower mold bodies may be reconfigured when it is desired to mold fibrous insulation products of different shapes. In one embodiment of the invention the shape of either or both of the upper and lower mold surfaces 28, 32 can be changed to accommodate the need to mold products 34 of different shapes. The surfaces 28, 32 may be formed of individual mold surface elements 40 that are movable to change the contour of the molding surfaces 28, 32. The mold surface elements 40 can be moved mechanically, with hydraulics, with magnetic forces, using a pneumatic system, or by any other means, not shown. The position of the mold surface elements 40 can be controlled by a controller so that various configurations or patterns of the mold surface elements can be programmed in advance. This allows multiple patterns to be stored and repeated, and enables the patterns to be programmed electronically with data from various sources, such as an electronic engineering drawing from a computer assisted drawing (CAD) machine.

Mold designs typically use moveable pins or mold surface elements, the pins or mold surface elements are mounted for movement that is not strictly vertical, but is nevertheless movement into and out of the mold cavity to change the contour of the mold surfaces 28, 32. For example, the movement into and out of the cavity to change the surface of the mold could be substantially horizontal. It is to be understood that the term.

Figure 4:
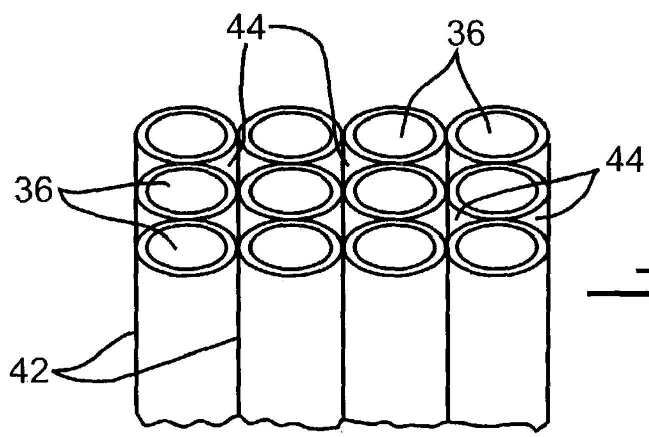
FIG. 4 is schematic perspective view of a plurality of contour tubes.
Figure 5:
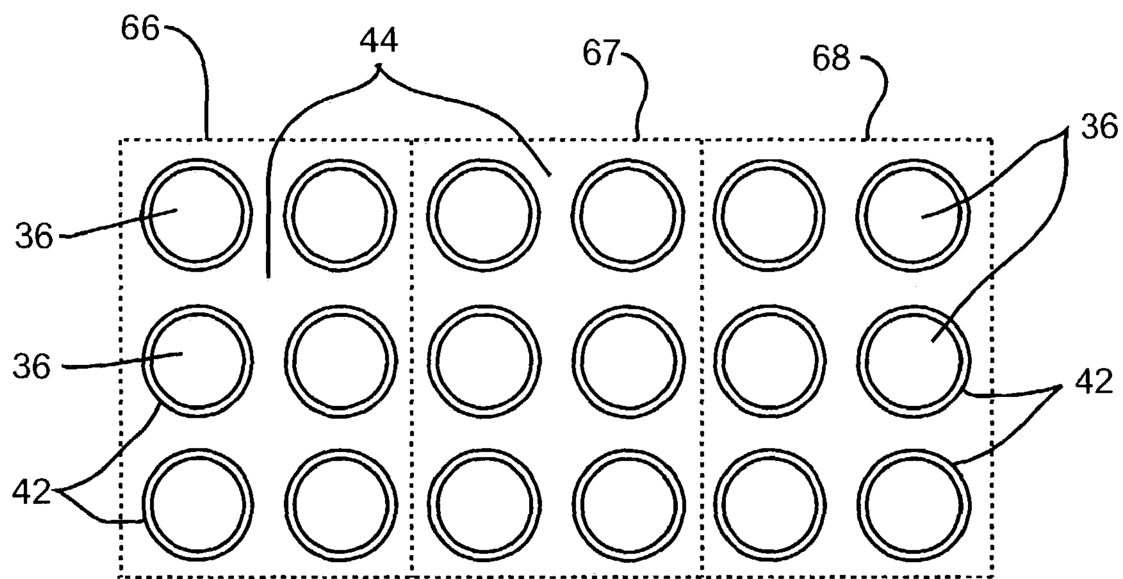
FIG. 5 is a plan view of the contour tubes of FIG. 4.
Figure 6:
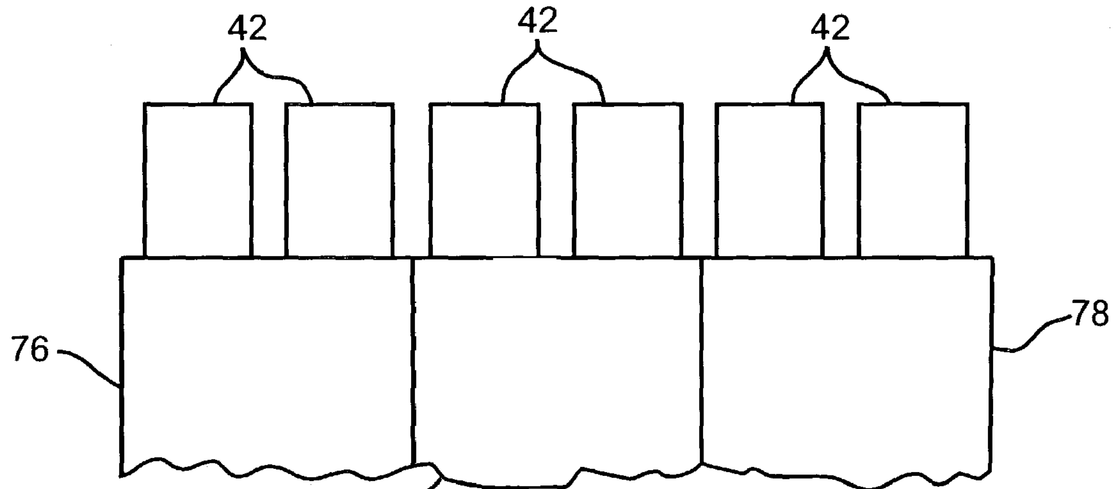
FIG. 6 is an elevational view of the contour tubes of FIG. 5.

As shown in FIGS. 4–6, the mold surface elements 40 optionally can be in the form of contour tubes 42 that are hollow, having the gas flow openings 36 at one end for the passage of the heated gases into the fibrous molding media 24. The gas flow openings 36 can form the upper and lower mold surfaces 28, 32, and can be configured to cover substantially the entire upper and lower mold surfaces, or just portions of the upper and lower mold surfaces. The hollow contour tubes 42 are shown as being approximately cylindrical in shape, with the gas flow openings 36 being substantially circular, and this shape defines voids 44 in the spaces between the mold surface elements. In embodiments of the invention where the gas flow openings 36 are substantially rectangular, the voids could be eliminated because the hollow contour tubes 42 could be fully packed to fill the upper and lower mold surfaces 28, 32. The contour tubes 42 are mounted, by means not shown, for movement toward and away from the mold cavity 20, thereby enabling the mold surfaces 28, 32 to be reconfigured as needed for different product designs. It is to be understood that some or all of the contour tubes can be closed or sealed. The upper surface of the contour tubes 40 can have any shape suitable for contacting the fibrous molding media 24, including rounded upper surfaces, pointed upper surfaces and flat upper surfaces. The contour tubes 40 can be threadably attached for easier changeout.

As shown in FIGS. 1 and 2, the upper mold assembly 16 is provided with an inlet conduit 48 and an outlet conduit 50 for controlling the flow of gas to and from the upper mold assembly. The inlet conduit 48 acts as a source of gas for the upper mold assembly 16. In a similar manner, the lower mold assembly 18 includes an inlet conduit 52 and an outlet conduit 54 for controlling the flow of gas to and from the lower mold assembly 18. Valves 56–59 are provided to control the flow of gas to and from the upper and lower mold assemblies. The upper and lower manifolds 26 and 30 are in open fluid communication with the contour tubes 42 so that gas supplied to the manifolds can be directed to the fibrous molding media 24 through the contour tubes 42. As an example, during a molding operation valves 56 and 59 can be closed and valves 57 and 58 left open. Gas entering the lower manifold 30 will flow through the lower contour tubes 42, through the fibrous molding media 24, through the upper contour tubes 42 and the upper manifold 26, and exit the upper manifold 26 through the upper outlet conduit 50. The flow of gas can be assisted by a vacuum device, such as a pump 62, which acts to apply a negative gas pressure to the upper contour tubes 42. The gas flowing through the mold and fibrous molding media 24 is typically heated to a temperature sufficient to cure organic binders in the case of mineral fibers, or to heat set the fibers in the case of a polymer fiber fibrous molding media.

The contour tubes 42 are connected to the upper and lower manifolds 26, 30, and the gas flowing from the manifolds flows through the contour tubes 42 into and out of the fibrous molding media 24. The voids 44 between the contour tubes 42 can also be used for the flow of gas from the manifolds 26 and 30 to the fibrous molding media 24. Therefore, the flow can be either through the contour tubes 42, through the voids 44, or through both the contour tubes and the voids, in which case both the contour tubes 42 and the voids 44 would define gas flow openings 36.

The gas supplied to the manifolds 26, 30 can be heated or cooled to produce the desired effect on the fibrous molding media 24. As an example of a molding operation using the molding apparatus of the invention, a polymer fiber molding media 24 can be placed into the mold cavity 20, the mold can be closed, and hot air can be blown through the fibrous molding media 24 from the lower contour tubes 42. In a typical example of a molding process with polymer fibers, the time required to soften the fibrous molding media appropriately for it to relax and conform to the shape of the cavity 20 is 5 to seconds, during which time the hot air is blown through the fibrous molding media. Thereafter, cold air can be blown through the fibrous molding media 24 to cool the fibers and set the fibers or cure the binder. The cooling of the fibrous molding media 24 stiffens it, thereby preventing further deformation. In this case, the gas source is comprised of an upper gas source and a lower gas source, with the two gas sources being independent of each other. One possible molding method according to the invention involves blowing hot air for about seconds into the fibrous molding media from the lower manifold 30, followed by blowing cold air or room temperature air through the fibrous molding media for about seconds from the upper manifold 26. The flow of cold or ambient air causes the fibrous molding media 24 to take on sufficient stiffness and strength that the resulting product 34 can be handled and removed from the mold without undesirable deformation.

The products that can be formed using the molding apparatus and method of the invention are varied. For some products, there is a need to treat different parts or portions of the fibrous molding media 24 in a different way from that of the remainder of the fibrous molding media. For example, the finished product 34 may have an area of greater density, as required by the product specifications. In order to properly set the fibers, or cure the binder on the fibers, in the area of greater density, it may necessary to supply more hot air, or air of a higher temperature, than that supplied to the remaining portions of the fibrous molding media 24. In order to more effectively control the flow of air into the fibrous molding media, the contour tubes 42 can be divided into different zones 66, 67 and 68, as shown in FIGS. 5 and 6. The connection between the gas source, conduit 52 for example, and the contour tubes 42 can be configured with gas flow channels 76, 77, and 78, each associated with one of the zones 66, 67 and 68, respectively. Each flow channel could be supplied by a different gas source of gas. With the contour tubes 42 divided into zones 66, 67 and 68, different flows of gas can be supplied to different zones. For example, if zone 66 is associated with a portion of the fibrous molding media 24 corresponding to an area of higher density, then the flow of gas through flow channel 76 to the contour tubes 42 in zone 66 can be at a higher temperature than the gases flowing through the contour tubes in the other zones 67 and 68. Alternatively, the hot gas flow through zone 66 could be longer in duration than the gas flow through the other zones 67 and 68 to achieve the desired result. Another alternative is that the gas pressure in zone 66 could be higher than the gas pressure in the other zones 67 and 68, with the resulting curing or heat setting occurring at a greater rate where it is needed.

One factor that will dictate the amount of curing or heat setting gas needed for any particular portion of the fibrous molding media 24 is the localized density of the fibers within that part of the fibrous molding media. Another factor that could result in a need for particular curing or heat setting gas flows is the desired surface quality of the ultimate molded product 34. In some products 34 the appearance of the product in localized areas can be affected by the flow of curing or heat setting gases. For example, the curing rate or heat setting rate or temperature history can affect the appearance, including the color and/or the texture, of the molded product.

The use of a flow of gases through the fibrous molding media 24 for curing or heat setting provides particular advantages over conventional molding process relying primarily on convection-based heat transfer. The temperature of the fibrous molding media can be changed almost instantly by the flow of gases of the desired temperature through the fibrous molding media. This allows almost instant hot gas flow, and then almost instant cold gas flow, thereby enabling very accurate control of the curing or heat setting process. Such good control of the molding process will produce molded products 34 with closer manufacturing tolerances than can be produced with conventional molding techniques. Another advantage of the invention is that additives can be applied to the flow of gases through the fibrous molding media for various desirable effects. Examples of additives include flame retardants, stiffening agents, colorants, mold inhibitors, anti-bacterial agents, scent-imparting compounds, and insecticides. The additive could be in gaseous form, liquid form (e.g. air atomized liquid) or solid form, such as in a finely divided particulate form.

It is contemplated that the control tubes 42 would have diameter within the range of from about 1/16 inches to about ½ inches, although other sizes could by used. The packing of the control tubes could be arranged at a rate of anywhere from 1 to about 30 contour tubes per square cm. For increased flow of gasses to a particular portion of the fibrous molding media, or for portions may require intricate mold surface patterns or configurations, the contour tubes will be more closely packed together.

The method and molding apparatus of the invention can be useful in molding such products as headliners and hood liners for vehicles, commercial interior products, undercarpet products for vehicles and buildings, and thermal and acoustical insulation products for appliances.

The principle and mode of operation of this invention have been described in its preferred embodiments. However, it should be noted that this invention may be practiced otherwise than as specifically illustrated and described without departing from its scope.

What is claimed is:

1. A mold for molding fibrous molding media comprising:

upper and lower mold bodies defining a mold cavity, the upper and lower mold bodies being movable relative to each other to close the mold, the upper and lower mold bodies having respective upper and lower mold surfaces for contacting the fibrous molding media positioned within the mold, and the upper and lower mold surfaces having gas flow openings configured to direct gases into direct contact with the fibrous molding media, wherein the mold surfaces are comprised of a plurality of contour tubes defining the gas flow openings wherein said contour tubes are mounted for movement toward and away from the cavity, thereby enabling the plurality of contour tubes to reconfigure the mold surfaces; and a source of gas connected to the gas flow openings.

2. The mold of claim 1 in which the mold body includes a gas manifold positioned intermediate the source of gas and the gas flow openings.

3. The mold of claim 1 in which the mold surfaces are comprised of a plurality of contour tubes defining voids between adjacent contour tubes, wherein the voids define the gas flow openings.

4. The mold of claim 1 in which the mold surfaces are comprised of a plurality of contour tubes defining voids between adjacent contour tubes, wherein both the contour tubes and the voids define the gas flow openings.

5. The mold of claim 1 in which the gas flow openings are divided into a multiplicity of zones, and wherein the connection between the source of gas and the flow openings includes different gas flow channels for different zones.

6. The mold of claim 5 in which the source of gas and the gas flow channels are configured to supply gas at different gas pressures for different zones.

7. The mold of claim 5 in which the channels are configured to supply gas at different gas temperatures for different zones.

8. The mold of claim 1 in which the source of gas includes upper and lower gas sources, with each of the upper and lower gas sources being configured to supply gas at a temperature independent of the other gas source.

9. The mold of claim 1 in which the source of gas includes upper and lower gas sources, with each of the upper and lower gas sources being configured to supply gas at a pressure independent of the other gas source.

10. The mold of claim 1 in which the gas flow openings cover substantially the entire upper and lower mold surfaces.

* * * * *